US009313265B2

(12) United States Patent
Peterson (10) Patent No.: US 9,313,265 B2
(45) Date of Patent: Apr. 12, 2016

(54) SYSTEM AND METHOD FOR PROVIDING INDIVIDUALIZED PORTABLE ASSET APPLICATIONS (71) Applicant: Google Inc., Mountain View, CA (US)

(72) Inventor: Bret Peterson, Lafayette, CA (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 14/261,612

(22) Filed: Apr. 25, 2014

(65) Prior Publication Data
US 2015/0312323 A1 Oct. 29, 2015

(51) Int. Cl.
G06F 15/16 (2006.01)
H04L 29/08 (2006.01)
G06F 17/30 (2006.01)
G06F 9/445 (2006.01)
H04W 4/00 (2009.01)
H04W 4/02 (2009.01)

(52) U.S. Cl.
CPC ............... *H04L 67/10* (2013.01); *G06F 9/445* (2013.01); *G06F 17/30241* (2013.01); *H04L 67/34* (2013.01); *H04W 4/001* (2013.01); *H04W 4/028* (2013.01)

(58) Field of Classification Search
CPC ... H04L 67/10; H04L 67/34; G06F 17/30241; G06F 9/445; H04W 4/001; H04W 4/028
See application file for complete search history.

(56) References Cited

U.S. PATENT DOCUMENTS 7,450,003 B2 * 11/2008 Weber .................... G01C 21/20
340/539.2
7,873,697 B2 1/2011 Goldstein et al.
8,068,849 B2 * 11/2011 Manson ............ G06F 17/30241
455/451
8,385,964 B2 2/2013 Haney
8,739,123 B2 * 5/2014 Appleton ............... G06Q 30/02
717/120
2006/0242111 A1 10/2006 Goldstein
2008/0307498 A1 12/2008 Johnson et al.
2009/0315766 A1 12/2009 Khosravy et al.
2011/0205229 A1 * 8/2011 Jagadev ............ G06F 17/30241
345/428
2012/0038633 A1 2/2012 Clark et al.
2013/0238599 A1 9/2013 Burris
2013/0325920 A1 12/2013 Peterson et al.

OTHER PUBLICATIONS

PCT/US2015/024695 International Search Report and Written Opinion. Dated Jun. 30, 2015 (10 pages).
Related U.S. Appl. No. 13/924,886, filed Jun. 24, 2013.
Related U.S. Appl. No. 13/953,997, filed Jul. 30, 2013.

* cited by examiner

Primary Examiner — Krisna Lim
(74) Attorney, Agent, or Firm — Dority & Manning, P.A.

(57) ABSTRACT

In one aspect, a computer-implemented method for providing individualized portable asset applications may generally include providing access to a master geospatial asset and receiving a user input associated with generating a portable geospatial asset based on the master geospatial asset, wherein the portable geospatial asset corresponds to a data subset of the master geospatial asset. The method may also include generating the portable geospatial asset based on the user input and embedding the portable geospatial asset within an asset application, wherein the asset application includes computer-readable instructions for rendering the portable geospatial asset. In addition, the method may include transmitting the asset application containing the portable geospatial asset to a separate computing device.

20 Claims, 5 Drawing Sheets

FIG. 5

SYSTEM AND METHOD FOR PROVIDING INDIVIDUALIZED PORTABLE ASSET APPLICATIONS

FIELD

The present subject matter relates generally to portable geospatial assets and, more particularly, to a system and method for providing individualized portable asset applications wherein each asset application contains a separate portable geospatial asset embedded therein.

BACKGROUND

Geographic Information Systems (GIS) clients capture, store, manage and display data elements according to geospatial coordinates. For example, mapping clients, such as Google Maps, render maps, satellite imagery and other data over a two-dimensional surface. Similarly, earth-browsing clients, such as Google Earth, render satellite imagery, terrain, vectors and other data over a three-dimensional geometry representing the Earth's surface. Thus, a user of Google Maps or Google Earth may navigate across the two-dimensional surface or three-dimensional geometry while data and images corresponding to geographical locations are presented to the user.

To provide for such a user experience, an enormous amount of geospatial data must be organized and indexed into geospatial assets, such as 2-D maps or 3-D globes. Typically, users rely on access to central or master servers to provide this geospatial data to their mapping or earth-browsing clients. However, it is often the case that access to such master servers is not available, thereby limiting or preventing a user from retrieving the desired geospatial data. Moreover, even when a user is provided access to the subject geospatial data, it is often challenging for the user to manage the data associated with multiple different geospatial assets, particularly when the user is attempting the mange the data on a portable device, such as a smartphone or tablet.

SUMMARY

Aspects and advantages of embodiments of the invention will be set forth in part in the following description, or may be obvious from the description, or may be learned through practice of the embodiments.

In one aspect, the present subject matter is directed to a computer-implemented method for providing individualized portable asset applications. The method may generally include providing access to a master geospatial asset and receiving a user input associated with generating a portable geospatial asset based on the master geospatial asset, wherein the portable geospatial asset corresponds to a data subset of the master geospatial asset. The method may also include generating the portable geospatial asset based on the user input and embedding the portable geospatial asset within an asset application, wherein the asset application includes computer-readable instructions for rendering the portable geospatial asset. In addition, the method may include transmitting the asset application containing the portable geospatial asset to a separate computing device.

In another aspect, the present subject matter is directed to a system for providing access to individualized portable asset applications. The system may generally include one or more computing devices comprising one or more processors and associated memory. The memory may store instructions that, when executed by the processor(s), configure the computing device(s) to access a master geospatial asset and transmit a user input associated with generating a portable geospatial asset based on the master geospatial asset, wherein the portable geospatial asset corresponds to a data subset of the master geospatial asset. The computing device(s) may also be configured to transmit a second user input associated with at least one of creating or customizing an asset application within which the portable geospatial asset is to be embedded, wherein the asset application includes computer-readable instructions for rendering the portable geospatial asset. In addition, the computing device(s) may be configured to store the asset application containing the portable geospatial asset within the memory.

In a further aspect, the present subject matter is directed to a tangible, non-transitory computer-readable medium storing computer-executable instructions that, when executed by one or more processors, cause the processor(s) to perform specific operations. The operations may generally include receiving, from a local computing device, data associated with a user and determining a predicted region of interest for the user based on the data. The predicted region of interest may correspond to a geographical region of a master geospatial asset. The operations may also include generating a portable geospatial asset based on the predicted region of interest and embedding the portable geospatial asset within an asset application. The asset application may include computer-readable instructions for rendering the portable geospatial asset. In addition, the operations may include transmitting the asset application containing the portable geospatial asset to the local computing device.

Other exemplary aspects of the present disclosure are directed to other methods, systems, apparatus, non-transitory computer-readable media, user interfaces and devices for providing individualized portable asset applications.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Reference now will be made in detail to embodiments, one or more examples of which are illustrated in the drawings.

Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

Overview

In general, the present subject matter is directed to a system and method for providing individualized portable asset applications. Specifically, in several embodiments, a map developer or other user may be allowed to initially create a portable geospatial asset from a master geospatial asset that corresponds to a data subset of the master geospatial asset. For example, a suitable user interface may be provided to the user for cutting the portable asset from the master asset. Alternatively, in other embodiments, a portable geospatial asset may be automatically created based on geospatial data predicted to be of interest to a user. Regardless, once cut or created, the portable geospatial asset may be embedded into a downloadable application including suitable computer-readable instructions for rendering the asset, such as the rendering code typically included within an earth-browsing or mapping client. This application, which now includes the portable geospatial asset embedded therein, may then be made accessible to a user(s). For example, the application may be sent to a user's device via email, made available for download onto the user's device via a URL and/or otherwise may be transmitted to user's device using any other suitable means.

In several embodiments, each portable asset application may correspond to a standalone computer-executable application configured to contain and render only the portable geospatial asset embedded therein. Thus, for a user that desires to have access to multiple different portable geospatial assets on his/her device, each individual asset may be made available within a separate asset application, with each application including its own code for rendering the associated asset. Such individualized asset applications may allow for users of portable devices, such as smartphones and tablets, to more effectively and efficiently manage their asset data. This is particularly true given the current app infrastructure associated with many portable devices (e.g., given the extensive app markets available to devices using Android and iOS operating systems) and the familiarity of users in managing large numbers of applications on their devices.

Moreover, the individualized asset applications provide users increased convenience for accessing and/or distinguishing between different portable geospatial assets on their devices. For example, each asset application downloaded onto a user's device may include a unique ID or name that allows for the user to easily recognize which portable geospatial asset is associated with each application. For instance, an asset application including a portable geospatial asset containing detailed geospatial data related to restaurants in San Francisco may be named "San Francisco Restaurants" whereas an asset application including a portable geospatial asset containing detailed geospatial data related to cable car routes in San Francisco may be named "San Francisco Cable Cars," thereby allowing a user to easily distinguish and select between the asset applications on his/her device depending on the specific geospatial data desired to be accessed by the user.

As used herein, the term "geospatial asset" generally refers to any data that may be rendered or otherwise used by a GIS client or application, such as 2-D maps, 3-D globes, geospatial search data, updates to existing geospatial data and/or the like. In addition, the term "geospatial asset" may also include a GIS client, itself, such as the individualized asset applications disclosed herein. As is generally understood, a 2-D map may correspond to geospatial data that has been organized and indexed such that the data may be rendered over a two-dimensional surface. Similarly, a 3-D globe may generally correspond to geospatial data that has been organized and indexed such that the data may be rendered over a three-dimensional geometry representing the Earth's surface. For example, in one embodiment, a 3-D globe may be a directory hierarchy containing a number of packet bundles or files that may be used to serve imagery, terrain and vectors to an earth-browsing client. In such an embodiment, the 3-D globe may be a master globe including imagery, terrain and vector data or a portable globe including a smaller subset of the imagery, terrain and vector data forming the master globe. For instance, it should be appreciated that specific imagery, terrain and vector data (corresponding to, for example, a specific geographical region(s) of a 3-D globe) may be cut or selected from one 3-D globe and organized/indexed to form a different 3-D globe. Similarly, smaller subsets of the data forming a particular 2-D map may also be selected and organized/indexed to form a different 2-D map.

It should be appreciated that the technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Example Systems for Providing Individualized Portable Asset Applications

Figure 1:
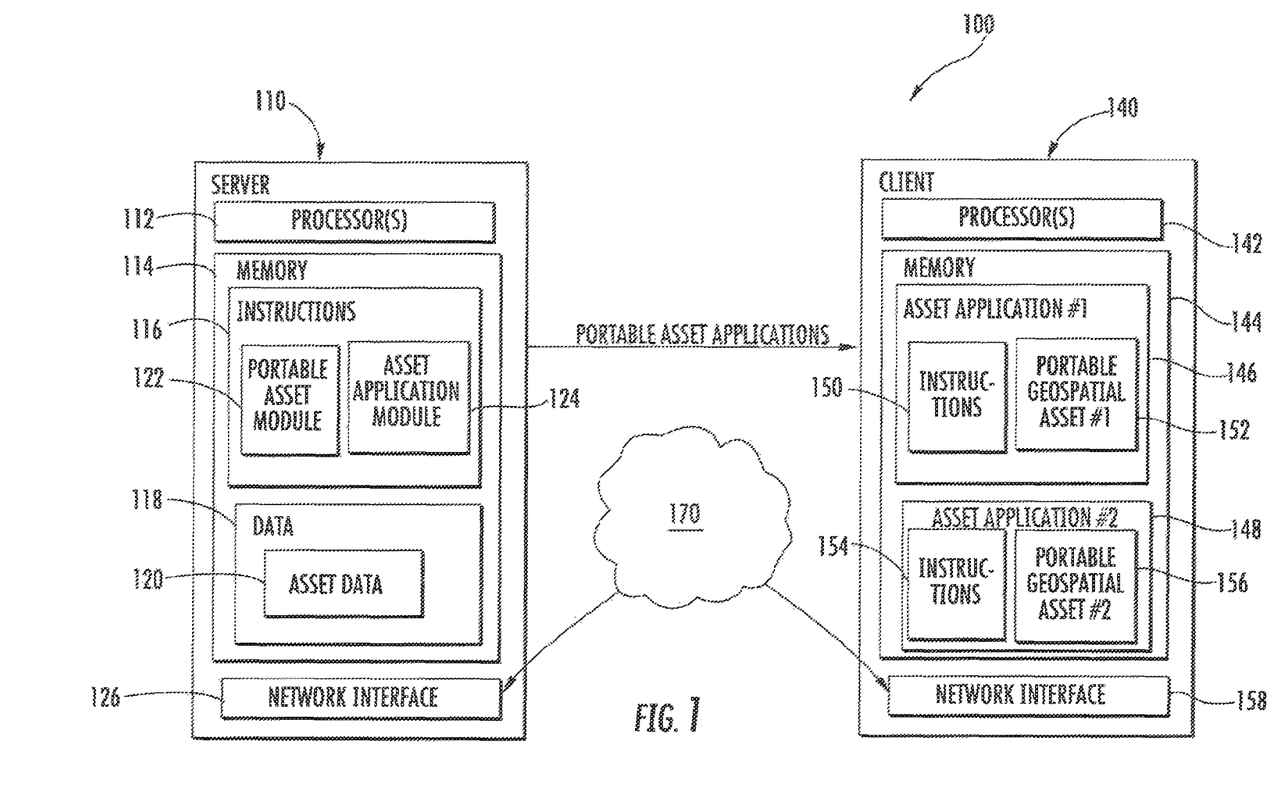
FIG. 1 illustrates a schematic diagram of one embodiment of a system for providing individualized portable asset applications in accordance with aspects of the present subject matter.

Referring now to FIG. 1, one embodiment of a system 100 for providing individualized portable asset applications is illustrated in accordance with aspects of the present subject matter. As shown in FIG. 1, the system 100 may include a client-server architecture where a server 110 communicates with one or more clients, such as a local client device 140, over a network 170. The server 110 may generally be any suitable computing device, such as a remote web server(s) or a local server(s), and/or any suitable combination of computing devices. For instance, the server 110 may be implemented as a parallel or distributed system in which two or more computing devices act together as single server. Similarly, the client device 140 may generally be any suitable computing device(s), such as a laptop(s), desktop(s), smartphone(s), tablet(s), mobile device(s), wearable computing device(s), a display with one or more processors coupled thereto and/or embedded therein and/or any other computing device(s). Although only a single client device 140 is shown in FIG. 1, it should be appreciated that any number of clients may be connected to the server 110 over the network 170.

As shown in FIG. 1, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 1, the memory 114 may include an asset database 120 storing asset data associated with one or more geospatial assets, such as one or more 3-D globes, 2-D maps and/or any other suitable geospatial assets (e.g., search data). For instance, the asset data may correspond to any suitable data or information associated with a given master geospatial asset, such as image data, vector data, terrain data, layer data, search data and/or the like associated with a master 3-D globe and/or a master 2-D map. As will be described below, a portion of the asset data associated with a specific master geospatial asset may be utilized to create a portable geospatial asset based on the master asset, which may then be embedded into a suitable portable asset application and subsequently made available to one or more users (e.g., via download).

In addition, the memory 114 may include any other suitable data 118. For example, as will be described below, the memory 114 may store event data and/or any other suitable data collected from a client device 140 that may be used by the server 110 to predict what geospatial data may be of current interest to a user.

As shown in FIG. 1, the instructions 116 stored within the memory 114 may be executed by the processor(s) 112 to implement a portable asset module 122. In several embodiments, the portable asset module 122 may be configured to provide a means for allowing a user to access the asset database 120 and cut or otherwise create a portable geospatial asset based on a given master geospatial asset. As indicated above, each portable geospatial asset may correspond to a data subset of its corresponding master geospatial asset. For instance, if the server 110 is configured to provide access to 3-D globes, a master globe may be stored within the asset database 120 that corresponds to a high resolution, multi-level globe including geospatial data, such as imagery, terrain and vector data, that has been fused together to create a large, navigable globe. Thus, a portable globe may be created, for example, by cutting or removing certain geospatial data from the master globe to provide a new, smaller globe. Specifically, in one embodiment, the portable globe may be created by copying all of the geospatial data from the master globe for a selected geographic region of interest (ROI) while disregarding portions of the geospatial data for other geographic regions. As such, the geographic region within the portable globe corresponding to the selected ROI may, for example, be rendered at high resolutions whereas other geographic regions may be rendered at lower resolutions. Similarly, if the server 110 is configured to provide access to 2-D maps, a master map may be stored within the asset database 120 and used as the basis for creating smaller, portable maps.

It should be appreciated that the portable asset module 122 may be configured to allow a portable geospatial asset to be cut from a corresponding master geospatial asset or otherwise created based upon such master asset using any suitable means and/or method known in the art. For instance, U.S. Pat. Pub. No. 2011/0205229 (Jagadev et al.), filed on Feb. 23, 2010 and entitled "Portable Globe Creation For a Geographical Information System," the disclosure of which is hereby incorporated by reference herein for all purposes, discloses a system and method for creating portable geospatial assets based on a master geospatial asset. Specifically, the disclosure utilizes a user-selected ROI to generate a portable asset that includes greater amounts of geospatial data for the user-selected ROI than for the remainder of the portable asset. A similar methodology may, for example, be utilized herein to allow for the creation of portable geospatial assets based on one or more master geospatial asset.

For instance, in several embodiments, the portable asset module 122 may be configured to provide a user interface for display on the client device 140 that allows a user to cut a portable geospatial asset from a given master geospatial asset. One example of a suitable user interface is provided in FIG. 2. As shown, the user interface 200 may include a display window 202 that allows the user to view all or a portion of the master geospatial asset. Additionally, display tools 204 may be provided to allow the user to navigate and/or manipulate the master geospatial asset (e.g., navigation and/or zoom buttons).

Figure 2:
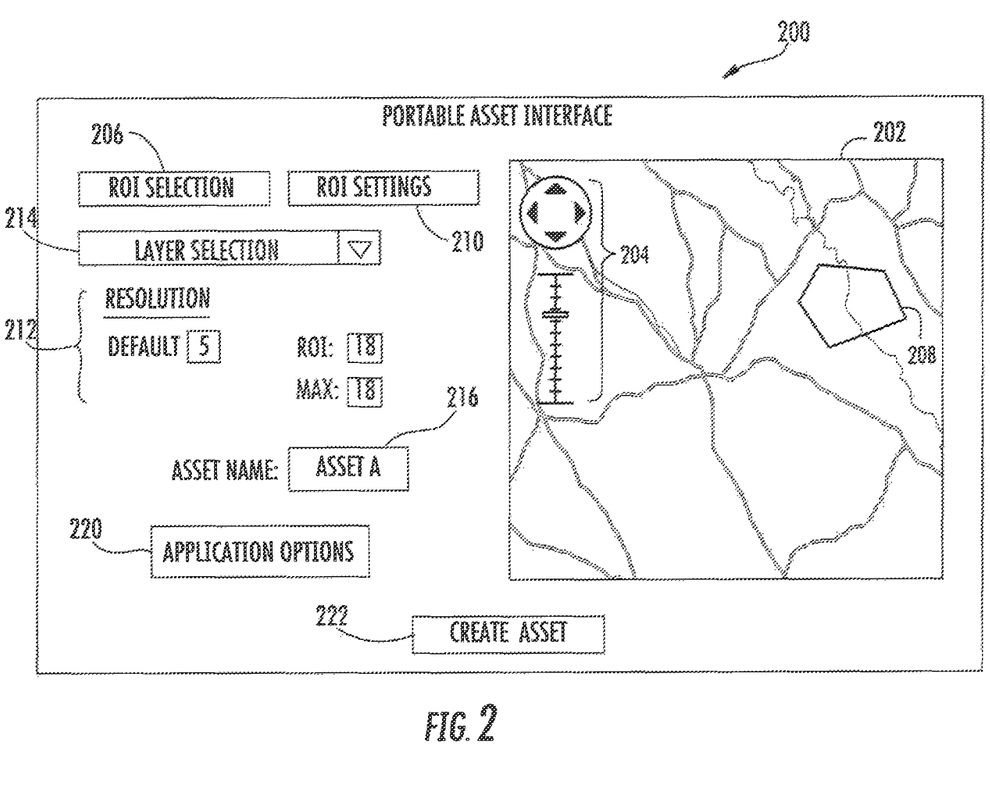
FIG. 2 illustrates one example of a suitable user interface that may be presented to a user for creating portable geospatial assets.

As shown in FIG. 2, the user interface 200 may also include an ROT selection button 206 to allow a user to select one or more geographic regions or ROIs within the master geospatial asset by creating or drawing a shape that defines a boundary for each selected ROI. For instance, the user may be allowed to draw a polygon within the display window 202 to select a specific ROI (e.g., region 208). In addition, the user interface 200 may include an ROI settings button 210 which may allow a user to adjust the settings for each selected ROI, such as by varying the shape of the polygon (e.g., to a rectangle, circle, etc.).

As indicated above, in several embodiments, portable geospatial assets may be created by copying all or a significant portion of the geospatial data from a corresponding master geospatial asset for any selected ROI(s) while disregarding portions of the geospatial data for other geographic regions, which may allow for such ROI(s) to be rendered at higher resolutions. In such embodiments, the user interface 200 may include input boxes 212 for selecting the desired resolution level(s) for the portable geospatial asset, which may directly impact the amount of geospatial data to be included within the portable asset. For instance, in one embodiment, the user may select a default resolution corresponding to the resolution level at which the entire portable geospatial asset may be capable of being rendered. In addition, the user may select a ROI resolution for each selected ROI corresponding to the resolution level at which such ROI(s) may be rendered. For example, as shown in FIG. 2, the ROI resolution has been set at a significantly higher resolution level than the default resolution. As a result, when creating the portable geospatial asset, the geospatial data included within the master geospatial asset that is associated rendering the selected ROI(s) at the higher resolution level may be copied into or otherwise included within the portable geospatial asset while the geospatial data associated with rendering other geographic regions at such higher resolution level may be removed or otherwise excluded from the portable geospatial asset. Instead, with respect to the other geographic regions, the portable geospatial asset may, for example, only include the geospatial data required to render such geographic regions at the selected default resolution level.

Moreover, the user interface 200 may also include a layer selection tool 214 to allow a user to select specific data layers to be included within the portable geospatial asset being created. For instance, various pre-defined and/or customizable data layers may be available for inclusion within a given portable geospatial asset, such as road data layers, point-of-interest (POI) data layers, search data layers and/or the like. Additionally, the user interface 200 may include an input box 216 that allows the user to specify an asset name to be associated with the portable geospatial asset being created. In such an embodiment, the name specified within the box may be utilized, for example, as the name of the corresponding asset application within which the portable asset is being embedded.

It should be appreciated that the user interface 200 shown in FIG. 2 is simply provided as one example of a suitable user interface for creating portable geospatial assets. It should also be appreciated that the user interface 200 may include any other suitable interface tools, buttons and/or the like for creating and/or customizing a portable geospatial asset.

It should also be appreciated that, as an alternative to generating a portable geospatial asset based on user inputs or in response to a user request, the portable asset module 122 may, instead, be configured to automatically generate a portable geospatial asset. For instance, as will be described below, the portable asset module 122 may be configured to automatically generate a portable geospatial asset by predicting what geospatial data included within a master geospatial asset may be of current interest to the user.

Referring back to FIG. 1, the instructions 116 stored within the memory 114 may also be executed by the processor(s) 112 to implement an asset application module 124. In general, the asset application module 124 may be configured to embed each portable geospatial asset created by the portable asset module 122 within a separate asset application. As indicated above, each asset application may be configured as a stand-alone computer-executable application including suitable computer-readable instructions for rendering the specific portable geospatial asset embedded therein. For instance, if a portable geospatial asset corresponds to a portable 3-D globe, the corresponding asset application may include suitable code adapted for rendering 3-D globes, such as the rendering code typically included within an earth-browsing client (e.g., Google Earth). Similarly, if a portable geospatial asset corresponds to a portable 2-D map, the corresponding asset application may include suitable code adapted for rendering 2-D maps, such as the rendering code typically included within a mapping client (e.g., Google Maps).

In several embodiments, the asset application module 124 may provide a generic skeleton application for receiving each portable geospatial asset created by the portable asset module 122. For instance, the skeleton application may include generic code for rendering the specific type of portable asset being created. Thus, for each portable geospatial asset created, the asset application module may be configured to simply embed the asset into a copy of the generic skeleton application and provide the application with a unique ID or name (e.g., the name provided in box 216 of FIG. 2), thereby creating an individualized application for such potable geospatial asset.

In addition to the generic skeleton application, or as an alternative thereto, the asset application module 124 may provide a user with the ability to customize the application within which a given portable geospatial asset will be embedded. For example, various pre-set customization options may be made available to the user, such as by offering additional code that can be integrated into the application for implementing GPS tracking, field data gathering and/or any other additional features. Alternatively, the user may be allowed to add to the existing code included within the skeleton application with code from a different source (e.g., the user's own customized code) to customize the application or the user may completely replace the existing code with entirely different code in order to create a completely customized asset application.

Moreover, in several embodiments, a user may be allowed to access or implement the asset application module 124 when cutting a given portable geospatial asset such that the portable asset may be automatically embedded within its corresponding asset application upon creation of such asset. For instance, as shown in FIG. 2, in one embodiment, an application button 220 may be provided within the user interface 200 that, when selected, brings up another interface providing options for creating and/or customizing the corresponding asset application, such as by providing a user the option to select and/or customize the generic skeleton application and/or to input new code to be included within the corresponding application. In such an embodiment, once the user has selected the desired application option(s), the user may, for example, be returned back to the user interface 200 shown in FIG. 2 and allowed to select an asset creation button 222. Upon selection of the button 222, the portable geospatial asset may be created and automatically embedded into an asset application created in accordance with the option(s) selected by the user. Alternatively, the user may be allowed to select the option(s) to be applied to the asset application after the corresponding portable geospatial asset has been created. For instance, upon selection of the asset creation button 222, a new interface may be displayed to the user to allow him/her to select the desired application options.

It should be appreciated that each portable geospatial asset may be embedded within a corresponding asset application using any suitable embedding technique and/or methodology known in the art. For instance, in several embodiments, the portable geospatial asset may be embedded within the application as a separate file asset, such as by simply placing the asset within an "asset" directory included within the application. Alternatively, the portable geospatial asset may be directly embedded within the code associated with its corresponding asset application.

It should also be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

As shown in FIG. 1, the server 110 may also include a network interface 126 for providing communications over the network 170. In general, the network interface 126 may be any device/medium that allows the server 110 to interface with the network 170.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data that may be accessed by the processor(s) 142 and instructions that may be executed by the processor(s) 142. The data may generally correspond to any suitable files or other data that may be retrieved, manipulated, created, or stored by processor(s) 142. In several embodiments, the data may be stored in one or more databases. Similarly, the instructions stored within the memory 144 may generally be any set of instructions that, when executed by the processor(s) 142, cause the processor(s) 142 to provide desired functionality. For example, the instructions may be software instructions rendered in a computer readable form or the instructions may be implemented using hard-wired logic or other circuitry.

In several embodiments, one or more portable asset applications 146, 148 may be downloaded from the server 110 and stored within the memory 144 of the client device 140. For instance, as shown in FIG. 1, first and second portable asset applications 146, 148 are stored within the memory 144. However, in other embodiments, any other number of portable asset applications may be stored within the memory 144, such as a single portable asset application or three or more portable asset applications.

As indicated above, each asset application may include a portable geospatial asset embedded therein as well as corresponding computer-readable instructions for implementing the application (e.g., rendering code and, optionally, code for providing any additional features, such as customized add-ons). For example, as shown in FIG. 1, the first portable asset application 146 may include a set of instructions 150 for allowing a user to display and/or interact with a first portable geospatial asset 152 embedded within the first application 146. Similarly, the second portable asset application 148 may include a set of instructions 150 for allowing the user to display and/or interact with a second, different portable geospatial asset 154 embedded within the second application 148. Thus, to access the first portable geospatial asset 152, the first portable asset application 146 may be opened or otherwise executed on the client device 140 (e.g., upon selection by the user of an app icon for the first application 146 displayed on the home screen or desktop of the client device 140) whereas, to access the second portable geospatial asset 156, the second portable asset application 148 may be opened or otherwise executed on the client device 140 (e.g., upon selection by the user of a different app icon for the second application 148 displayed on the home screen or desktop of the client device 140).

It should be appreciated that, by embedding each portable geospatial asset into an individualized asset application and by allowing such application to be downloaded onto a user's device, the user may access, navigate through and/or interact with the portable geospatial asset without requiring a connection to the server 110 or any other network connection. Specifically, upon execution of a given asset application, the user's device may simply load the application file(s) from a designated address range in storage space (e.g., the device's SSD) into working memory. As indicated above, the application file(s) loaded from the designated address range may include both executable/interpretable code as well as the portable geospatial asset associated with the asset application being executed. Thus, at runtime, the application code can therefore operate without reference to external geospatial data, such as other files and data stored at the server 100, although of course, in some embodiments, additional data may be accessed by the client device 140 (e.g., when a network connection is available).

It should also be appreciated that, in addition to the data associated with any asset applications, any other suitable data may also be stored within the memory 144 of the client device 140. For instance, the memory 144 may include an event database (not shown) storing event data. In several embodiments, the event data may be associated with one or more travel-related events. As used herein, a "travel-related event" may generally refer to any instance in which a user is traveling between two locations using any suitable means of travel, such as by walking, driving or flying between two locations. Thus, event data may include, but is not limited to, any information related to a travel-related event(s), such as the location(s) and/or the date(s)/time(s) associated with the travel-related event(s). For instance, event data may include a specific address, building name, GPS coordinate(s), city, country and/or the like that relates directly to the destination (and/or starting point) of a travel-related event(s) or other information that relates indirectly to the destination (and/or starting point) of a travel-related event(s) (e.g., "Meet at Dave's House"). Similarly, event data may also include a specific time(s) and/or date associated(s) with the travel-related event(s), such as a time/date to leave for a destination and/or a time/date to arrive at such destination.

In several embodiments, the event data may be derived from any information source available to the client device 140, such as information received by, accessible to and/or created using client applications running on the device 140 and/or information accessible to the client device 140 over the network or using any other suitable information source. For instance, the event data may be associated with calendar and/or email applications, time management/scheduling applications, travel applications and/or any other suitable computer-related applications running on the device 140. Thus, event data may be collected from calendar entries, meeting invites, delivery schedules, travel itineraries and/or the like that are stored within and/or are otherwise accessible to the client device 140.

Moreover, as shown in FIG. 1, the client device 140 may also include a network interface 158 for providing communications over the network 170. Similar to the interface 126 for the server 110, the network interface 158 may generally be any device/medium that allows the client device 140 to interface with the network 170.

It should be appreciated that the network 170 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 3:
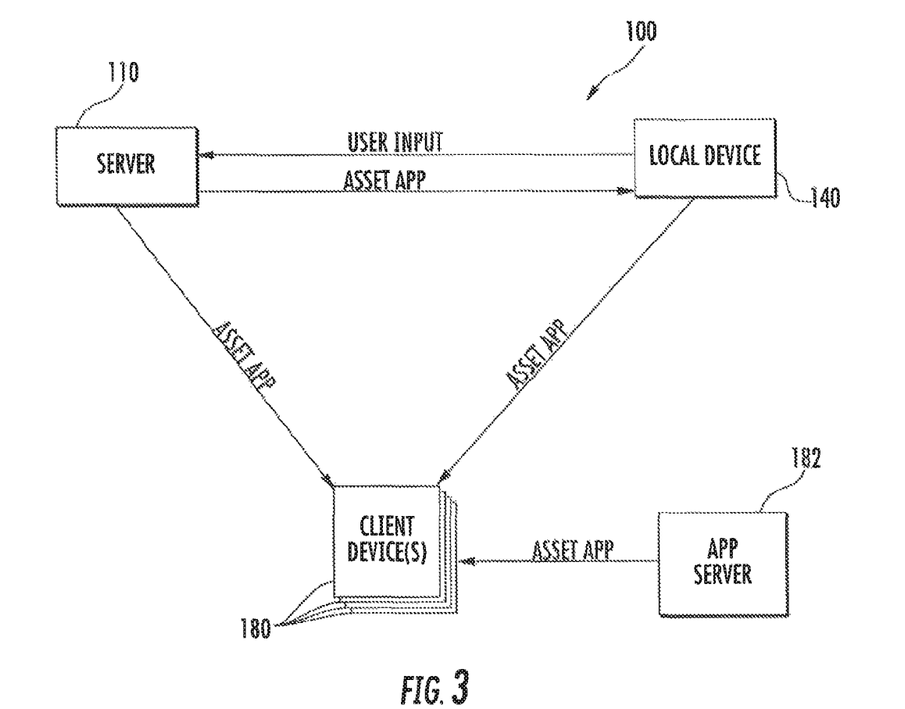
FIG. 3 illustrates a particular embodiment of the system shown in FIG. 1 for providing individualized portable asset applications in accordance with aspects of the present subject matter.

Referring now to FIG. 3, a schematic diagram of a particular embodiment of the system 100 described above is illustrated in accordance with aspects of the present subject matter. As shown in FIG. 3, a map developer or other user may use his/her local device (e.g., client device 140 from FIG. 1) to interface with the server 110 (e.g., via a suitable user interface) in order to provide user inputs for the creation of a portable geospatial asset based on a specific master geospatial asset made available via the server 110. For instance, as indicated above, the map developer may be allowed to specify the type and/or amount of geospatial data to be copied from the master geospatial asset and included within the portable geospatial asset, such as by selecting one or more geographic regions to be available for rendering at higher resolutions than other geographic regions and/or by selecting one or more asset or data layers to be included within the portable geospatial asset.

Once created, the portable geospatial asset may then be embedded directly into a corresponding asset application. For example, as indicated above, the portable geospatial asset may be automatically embedded within a skeleton asset application including generic code for rendering such asset or the portable geospatial asset may be embedded within an asset application that has been partially or fully customized by the user.

The asset application, having the portable geospatial asset contained therein, may then be downloaded onto the local device 140 and subsequently executed to provide the user access to the portable asset and/or, optionally, shared with other client devices 180. For instance, for a map developer, it may be desirable to share the asset application with any number of client devices 180, such as by transmitting the asset application to the client device(s) (e.g., via email) 180 and/or by making the asset application available for download from his/her device 140. Alternatively, the map developer may provide a notification to users that the asset application is available for download at the server 110. For instance, the map developer may provide a URL that can be accessed by users for downloading the asset application from the server 110 onto their devices 180. In another embodiment, the asset application may be transmitted from the server 110 or the local device 140 to any other suitable computing device, such as an app server(s) 182 providing a means for sharing the asset application (e.g., the app sharing platforms provided via the Android and/or Apple markets).

Example Methods for Providing Individualized Portable Asset Applications

Figure 4:
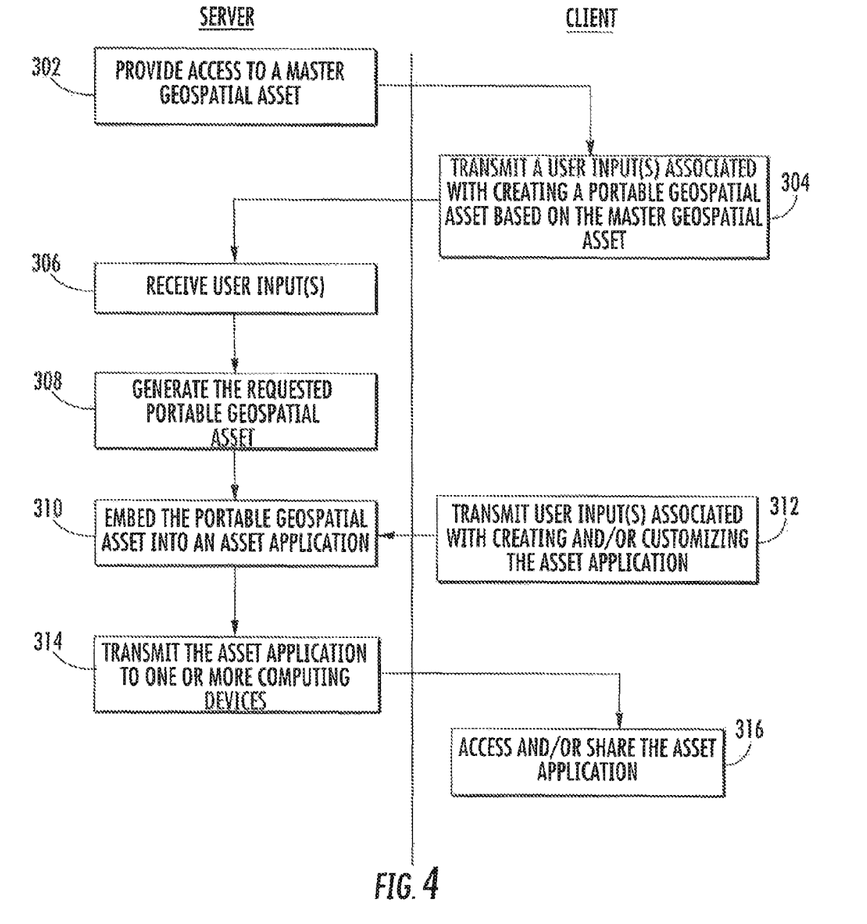
FIG. 4 illustrates a flow diagram of one embodiment of a method for providing individualized portable asset applications in accordance with aspects of the present subject matter.

Referring now to FIG. 4, a client-server flow diagram of one embodiment of a method 300 for providing individualized portable asset applications is illustrated in accordance with aspects of the present subject matter. The method 300 will generally be discussed herein with reference to the system 100 shown in FIGS. 1 and 3. However, those of ordinary skill in the art, using the disclosures provided herein, should appreciate that the methods described herein may be executed by any computing device or any combination of computing devices. Additionally, it should be appreciated that, although the method blocks 302-316 are shown in FIG. 4 in a specific order, the various blocks of the disclosed method 300 may generally be performed in any suitable order that is consistent with the disclosure provided herein.

As shown in FIG. 3, at (302), the method 300 may include providing access to a master geospatial asset. For instance, as indicated above, the server 110 may include an asset database 120 for storing one or more master geospatial assets, such as one or more master 3-D globes and/or one or more master 2-D maps. Additionally, as indicated above, the server 110 may be configured to implement a portable asset module 122 for providing a suitable user interface (e.g., interface 200 of FIG. 2) to allow a user to view, navigate and/or interact with the master geospatial asset.

At (304), the method 300 may include transmitting a user input(s) from the client device 140 associated with the creation of a portable geospatial asset. For instance, as indicated above, the user may be allowed to provide various inputs for creating a portable geospatial asset, such as by selecting one or more geographic regions to be rendered at higher resolutions and/or by selecting one or more asset or data layers to be included within the portable asset. Such inputs may be provided, for example, via the interface 200 shown in FIG. 2.

At (306), the method 300 may include receiving the user input(s) transmitted from the client device 140 and, at (308), generating the requested portable geospatial asset based on the user input(s). For instance, as indicated above, each portable geospatial asset may correspond to a data subset of its corresponding master geospatial asset. Thus, in several embodiments, the server 110 may be configured to create the requested portable geospatial asset by copying the portions of the geospatial data contained within the master geospatial that are desired to be included within the portable geospatial asset (e.g., based on the user input(s)) and creating a new file asset that includes the copied data.

Additionally, at (310), the method 300 may include embedding the portable geospatial asset into a corresponding asset application that includes suitable computer-readable instructions for rendering the asset. For instance, as described above, upon the creation of the portable geospatial asset, such portable asset may be embedded into its own particular asset application, such as by automatically embedding the portable asset into a generic skeleton application. Alternatively, the portable geospatial asset may be embedded into a partially or fully customized application based on one or more user input(s). For example, as shown in FIG. 4, the method 300 may, optionally, include at (312) transmitting a user input(s) from the client device 140 to the server 110 associated with the creation and/or customization of the asset application. As indicated above, each portable geospatial asset may be embedded into its own corresponding asset application using any suitable means and/or methodology, such as by embedding the asset within the application as a separate file asset or by directly embedding the asset within the application code.

As shown in FIG. 4, at (314), the method 300 may also include transmitting the asset application (having the portable geospatial asset embedded therein) to one or more computing devices. For instance, as indicated above with reference to FIG. 3, the asset application may be transmitted to the client device 140 that provided the user input(s) for creating the portable geospatial asset, which may then allow the asset to be accessed locally on such device and/or shared with other computing devices (e.g., at (316) in FIG. 4). Alternatively, the asset application may be made available for download at the server 110 to any number of client devices (e.g., devices 180 shown in FIG. 3) or may be transmitted to any other suitable computing device, such as the app server(s) 182 shown in FIG. 2.

As indicated above, it should be appreciated that, as an alternative to generating the portable geospatial asset based on user-initiated requests or inputs, the disclosed system and method may be configured to automatically generate a portable geospatial asset and subsequently embed such asset into a corresponding asset application for download onto a user's device. For example, in several embodiments, the system may be configured to collect event data and/or other suitable data made available by the user, such as calendar information, meeting schedules, delivery routes, travel itineraries and/or the like. This data may then be utilized to predict when and where specific geospatial data may be of interest to the user. Thereafter, the system may generate a portable geospatial asset that includes the predicted geospatial data. The portable geospatial asset may then be embedded into a suitable asset application and made available for download onto the user's device.

In several embodiments, the event data or other data collected from the user may be geocoded (i.e., by having geographic coordinates associated therewith). As such, the portable asset module 122 may be able to determine an exact geographic location associated with the data. However, for data that is not geocoded, the portable asset module 122 may be configured to predict a region-of-interest (ROI) that, based on the data, appears to encompass the geographic region that may be of interest to the user. In doing so, the portable asset module 122 may be configured to analyze the context of the data to determine various characteristics of the predicted ROI. For instance, if the data indicates that a user is traveling to various locations within a city, the predicted ROI may correspond to a polygon encompassing all or a portion of the city (e.g., a circular area having a 10 mile radius centered at the city center). Alternatively, if the data indicates that a user is traveling to a specific address or building, the predicted ROI may correspond to a smaller polygon centered at the address or building (e.g., a circular area having a 1 mile radius centered at the address/building). Similarly, if the data indicates that a user is traveling between two locations separated by a significant distance (e.g. a user that is driving or flying across the country), the predicted ROI may include a first polygon centered at the user's starting point and a second polygon centered at the user's travel destination, with the polygons being connected by polylines encompassing the suggested travel route between the two locations. In such instance, the associated portable asset may be generated such that the geographic region corresponding to the portion of the predicted ROI defined by the polylines may be capable of being rendered at a higher resolution if the event data indicates that the user is traveling by car as opposed to an airplane. For instance, a road map layer may be included within the portable geospatial asset at a higher resolution when the user is traveling by car.

In addition, network connectivity data may also be utilized to determine various characteristics of the predicted ROI and/or the associated portable geospatial asset. For instance, if it is determined that a user will have network access while traveling except for when he/she travels through one or more specific geographic regions, the predicted ROI may be selected to cover such geographic regions. In such instance, a portable geospatial asset may be created that includes geospatial data associated with the geographic regions lacking network connectivity.

It should be appreciated that, by predicting when and where specific geospatial data may be of interest to the user, new asset applications and/or updated geospatial assets may be automatically generated and transmitted to the user's device on a periodic basis. For instance, a portable geospatial asset may be generated, embedded within an asset application and downloaded to a user's device each night that includes geospatial data related to the specific events occurring the next day, such as by downloading a 2-D map including a driving directions layer with driving routes to each destination to which the user is traveling the next day. In such instance, the new asset application downloaded to the user's device may, for example, replace the asset application containing the portable geospatial asset including geospatial data relating to the previous day's events. Alternatively, for a user that is traveling for an extended period of time (e.g., a week), a portable geospatial asset may be generated, embedded within an asset application and downloaded to the user's device that includes geospatial data encompassing all events occurring during such time period.

Figure 5:
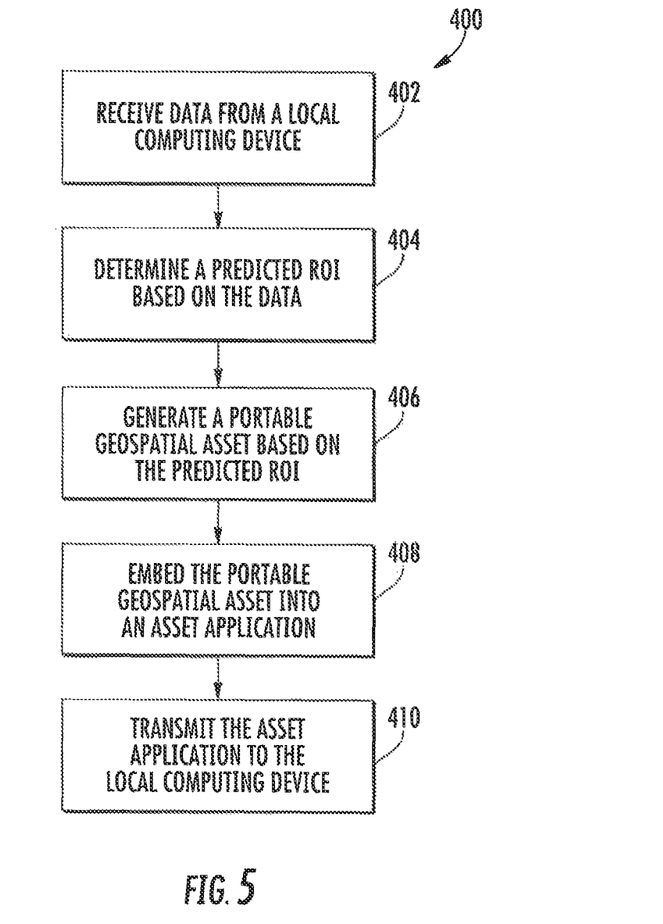
FIG. 5 illustrates a flow diagram of another embodiment of a method for providing individualized portable asset applications in accordance with aspects of the present subject matter.

Referring now to FIG. 5, a flow diagram of another embodiment of a method 400 for providing individualized portable asset applications is illustrated in accordance with aspects of the present subject matter. In general, the method 400 will be described herein with reference to the system 100 shown in FIG. 1. However, those of ordinary skill in the art, using the disclosures provided herein, should appreciate that the methods described herein may be executed by any computing device or any combination of computing devices.

Additionally, it should be appreciated that, although the method blocks 402-410 are shown in FIG. 5 in a specific order, the various blocks of the disclosed method 400 may generally be performed in any suitable order that is consistent with the disclosure provided herein.

As shown in FIG. 5, at (402), the method 400 includes receiving data from a local computing device, such as the local client device 140 of FIG. 1. For instance, as indicated above, event data and/or other data stored within and/or accessible to the client device 140 may be transmitted to the server 110. Such data may include, for example, any information associated with a travel-related event(s) of a user, such as the location(s) and/or the date(s)/time(s) associated with the travel-related event(s).

At (404), the method 400 includes determining a predicted ROI based on the data collected from the local computing device. Specifically, in several embodiments, the portable asset module 122 may be configured to analyze the data to predict which geographic ROI(s) may be of interest to the user. In doing so, the portable asset module 122 may be configured to assess the context of the data to determine one or more context-based characteristics for the predicted ROI.

Specifically, in several embodiments, the context of the data may be utilized to determine a geographic location for the predicted ROI. For example, if the data includes the textual string "Meet Tara at Times Square for New Year's Eve," it may be predicted that the text is referring to Times Square in New York City, particularly given the reference to New Year's Eve. As such, the geographic region associated with the predicted ROI may include all or a portion of New York City, such as by centering the geographic region at Times Square in New York City.

Additionally, the context of the data may be utilized to determine a size for the predicted ROI. For instance, if the event data provides an indication that a user is traveling to a particular city but does not indicate to what location within the city, the predicted ROI may be relatively large so as to encompass all or a portion of the city and its surrounding area (e.g., surrounding suburbs). Alternatively, if the data indicates that the user is traveling to a particular location within the city (e.g., a particular address or building), the predicted ROI may be relatively small so as to only capture the sections of the city around such location.

Moreover, the context of the data may be utilized to determine a shape for the predicted ROI. For instance, if the data simply indicates a travel destination for the user, the shape of the predicted ROI may be selected to encompass such travel destination, such as by defining the ROI using a circle, square or any other suitable polygon centered at the travel destination. Alternatively, the shape of the predicted ROI may be more complex. For example, if the event data indicates that the user is traveling between two separate locations the shape of the predicted ROI may be selected to encompass both locations as well as a suggested travel route between the locations.

Referring still to FIG. 5, at (406), the method 400 includes generating a portable geospatial asset based on the predicted ROI. For instance, in several embodiments, the portable geospatial asset may be generated such that the geographic region encompassed within the predicted ROI may be rendered at a higher resolution than other geographic regions not included within the predicted ROI. As indicated above, the geospatial data used to generate the portable geospatial asset may be derived from a master geospatial asset, with the portable asset corresponding to a data subset of the master asset. Thus, to provide for higher resolutions within the geographic region associated with the predicted ROI, all or a significant portion of the geospatial data contained within the master asset for such region may be included within the portable asset. In contrast, for geographic regions outside the predicted ROI(s), the portable asset may include a smaller portion of the geospatial data contained within the master asset for such other regions.

Additionally, at (408), the method 400 includes embedding the portable geospatial asset into a corresponding asset application that includes suitable computer-readable instructions for rendering the asset. For instance, as described above, upon the creation of the portable geospatial asset, such portable asset may be embedded into its own particular asset application, such as by automatically embedding the portable asset into a generic skeleton application.

Moreover, at (410), the method 400 includes transmitting the asset application (having the portable geospatial asset embedded therein) to the local computing device. For instance, in one embodiment, the asset application may be made available for download at the server 110 to the client device 140. In addition, or as alternative thereto, the asset application may be automatically transmitted to the client device 140. For example, as indicated above, the asset application may offered as an automatic update in order to provide the user access to new or updated geospatial data.

It should be appreciated that, in situations in which the systems and methods described herein access and analyze personal information about users, or make use of personal information, such as email data, calendar data and other forms of event data, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing individualized portable asset applications, the method comprising:
   providing, by one or more computing devices, access to a master geospatial asset;
   receiving, by the one or more computing devices, a user input associated with generating a portable geospatial asset based on the master geospatial asset, the portable geospatial asset corresponding to a data subset of the master geospatial asset;
   generating, by the one or more computing devices, the portable geospatial asset based on the user input;
   embedding, by the one or more computing devices, the portable geospatial asset within an asset application, the asset application including computer-readable instructions for rendering the portable geospatial asset; and
   transmitting, by the one or more computing devices, the asset application containing the portable geospatial asset to a separate computing device.

2. The computer-implemented method of claim 1, wherein the asset application corresponds to a first asset application, the method further comprising:
   receiving a second user input associated with generating a second portable geospatial asset based on the master geospatial asset, the second portable geospatial asset corresponding to a different data subset of the master geospatial asset;
   generating the second portable geospatial asset based on the second user input;
   embedding the second portable geospatial asset within a second asset application, the second asset application including computer-readable instructions for rendering the second portable geospatial asset; and
   transmitting the second asset application containing the second portable geospatial asset to the separate computing device as a separate standalone application from the first asset application.

3. The computer-implemented method of claim 1, further comprising receiving a second user input associated with at least one of creating or customizing the asset application.

4. The computer-implemented method of claim 1, wherein the asset application is only configured to have a single portable geospatial asset embedded therein.

5. The computer-implemented method of claim 1, wherein the separate computing device comprises a client device or an app server.

6. The computer implemented method of claim 1, further comprising providing the asset application for download onto the separate computing device.

7. The computer-implemented method of claim 1, wherein embedding the portable geospatial asset within the asset application comprises including the portable geospatial asset within the asset application as a separate file asset or directly embedding the portable geospatial asset within the computer-readable instructions.

8. A system for providing access to individualized portable asset applications, the system comprising:
   one or more computing devices including one or more processors and associated memory, the memory storing instructions that, when executed by the one or more processors, configure the one or more computing devices to:
   access a master geospatial asset;
   transmit a user input associated with generating a portable geospatial asset based on the master geospatial asset, the portable geospatial asset corresponding to a data subset of the master geospatial asset;
   transmit a second user input associated with at least one of creating or customizing an asset application within which the portable geospatial asset is to be embedded, the asset application including computer-readable instructions for rendering the portable geospatial asset; and
   store the asset application containing the portable geospatial asset within the memory.

9. The system of claim 8, wherein the asset application corresponds to a first asset application, the one or more computing devices being further configured to:
- transmit a third user input associated with generating a second portable geospatial asset based on the master geospatial asset, the second portable geospatial asset corresponding to a different data subset of the master geospatial asset;
- transmit a fourth user input associated with at least one of creating or customizing a second asset application within which the second portable geospatial asset is to be embedded, the second asset application including computer-readable instructions for rendering the second portable geospatial asset; and
- store the second asset application containing the second portable geospatial asset within the memory as a separate standalone application from the first asset application.

10. The system of claim 8, wherein the asset application is only configured to have a single portable geospatial asset embedded therein.

11. The system of claim 8, wherein the one or more computing devices are further configured to download the asset application from a server.

12. The system of claim 8, wherein the one or more computing devices are further configured to execute the asset application and render the portable geospatial asset without requiring connection to a network.

13. The system of claim 8, wherein the portable geospatial asset is embedded within the asset application as a separate file asset or is embedded directly within the computer-readable instructions.

14. A tangible, non-transitory computer-readable medium storing computer-executable instructions that, when executed by one or more processors, cause the one or more processors to perform operations, comprising:
- receiving, from a local computing device, data associated with a user;
- determining a predicted region of interest for the user based on the data, the predicted region of interest corresponding to a geographical region of a master geospatial asset;
- generating a portable geospatial asset based on the predicted region of interest, the portable geospatial asset corresponding to a data subset of the master geospatial asset;
- embedding the portable geospatial asset within an asset application, the asset application including computer-readable instructions for rendering the portable geospatial asset; and
- transmitting the asset application containing the portable geospatial asset to the local computing device.

15. The computer readable medium of claim 14, wherein the data corresponds to event data, the event data including location information associated with at least one travel-related event of the user.

16. The computer readable medium of claim 14, wherein the operations further comprise determining a context-based characteristic for the predicted region of interest based on the data.

17. The computer readable medium of claim 16, wherein the context-based characteristic corresponds to at least one of a geographic location of the predicted region of interest, a size of the predicted region of interest or a shape of the predicted region of interest.

18. The computer readable medium of claim 14, wherein the asset application is only configured to have a single portable geospatial asset embedded therein.

19. The computer readable medium of claim 14, further comprising providing the asset application for download onto the local computing device.

20. The computer readable medium of claim 14, wherein embedding the portable geospatial asset within the asset application comprises including the portable geospatial asset within the asset application as a separate file asset or directly embedding the portable geospatial asset within the computer-readable instructions.

* * * * *